(12) United States Patent
Liu et al.

(10) Patent No.: US 11,287,825 B2
(45) Date of Patent: Mar. 29, 2022

(54) PATH TRACKING METHOD AND MOBILE ROBOT USING THE SAME

(71) Applicant: UBTECH ROBOTICS CORP LTD, Shenzhen (CN)

(72) Inventors: Zhichao Liu, Shenzhen (CN); Youjun Xiong, Shenzhen (CN); Jian Zhang, Shenzhen (CN)

(73) Assignee: UBTECH ROBOTICS CORP LTD, Shenzhen (CN)

(*) Notice: Subject to any disclaimer, the term of this patent is extended or adjusted under 35 U.S.C. 154(b) by 206 days.

(21) Appl. No.: 16/576,794

(22) Filed: Sep. 20, 2019

(65) Prior Publication Data
US 2020/0133289 A1   Apr. 30, 2020

(30) Foreign Application Priority Data
Oct. 31, 2018   (CN) .......................... 201811289515.2

(51) Int. Cl.
*G05D 1/02* (2020.01)
*B25J 9/16* (2006.01)

(52) U.S. Cl.
CPC .......... *G05D 1/0234* (2013.01); *B25J 9/1666* (2013.01)

(58) Field of Classification Search
CPC .............. G01C 21/367; G01C 21/3635; G01C 21/3673; G01C 21/3667; G08G 1/0969
See application file for complete search history.

(56) References Cited

U.S. PATENT DOCUMENTS

| 10,279,809 | B2 * | 5/2019 | Habu | G08G 1/166 |
|---|---|---|---|---|
| 10,407,065 | B2 * | 9/2019 | Liu | B60W 30/143 |
| 10,640,112 | B2 * | 5/2020 | O Meachair | B60W 30/18 |
| 10,882,187 | B2 * | 1/2021 | Li | G05D 1/0219 |
| 2017/0201457 | A1 * | 7/2017 | Lee | H04L 41/0816 |
| 2017/0336792 | A1 * | 11/2017 | Gdalyahu | G01C 21/14 |
| 2019/0186927 | A1 * | 6/2019 | Koponen | G01C 21/32 |
| 2020/0225044 | A1 * | 7/2020 | Tohriyama | G05D 1/0212 |

FOREIGN PATENT DOCUMENTS

JP    3961378 B2 *  8/2007

* cited by examiner

*Primary Examiner* — Khoi H Tran
*Assistant Examiner* — Shahzab Hussain Shah

(57) ABSTRACT

The present disclosure provides a path tracking method as well as a mobile robot using the same. The method includes: obtaining a preset path and a current position of the mobile device; determining a forward-looking path point corresponding to the current position on the preset path; obtaining a path curvature corresponding to the forward-looking path point; and determining an adjustment velocity of the mobile device at the current position based on the path curvature corresponding to the forward-looking path point. In this manner, the adjustment velocity of the mobile device can be determined based on the curvature of the path, so as to adjust the velocity of the mobile device and improve the stability of path tracking of the mobile device at different path curvatures.

16 Claims, 11 Drawing Sheets

PATH TRACKING METHOD AND MOBILE ROBOT USING THE SAME

CROSS REFERENCE TO RELATED APPLICATIONS

This application claims priority to Chinese Patent Application No. 201811289515.2, filed Oct. 31, 2018, which is hereby incorporated by reference herein as if set forth in its entirety.

BACKGROUND

1. Technical Field

The present disclosure relates to computing technology, and particularly to a path tracking method as well as a mobile robot using the same.

2. Description of Related Art

At present, the existing path tracking methods for a mobile objective such as a robot, a car, and a movable object usually select an intersection point of a path and a forward-looking distance as a forward-looking point, and make the mobile objective to move on a rail of the path by controlling the mobile objective to continuously move toward the updated forward-looking point. However, at the positions near to the path points with large curvature, the path tracking methods tend to ignore the path points that should originally have reached, and there is occasionally the case that the mobile objective leaves the track and cannot be recovered.

BRIEF DESCRIPTION OF THE DRAWINGS

To describe the technical schemes in the embodiments of the present disclosure more clearly, the following briefly introduces the drawings required for describing the embodiments or the prior art. Apparently, the drawings in the following description merely show some examples of the present disclosure. For those skilled in the art, other drawings can be obtained according to the drawings without creative efforts.

DETAILED DESCRIPTION

In the following descriptions, for purposes of explanation instead of limitation, specific details such as particular system architecture and technique are set forth in order to provide a thorough understanding of embodiments of the present disclosure. However, it will be apparent to those skilled in the art that the present disclosure may be implemented in other embodiments that are less specific of these details. In other instances, detailed descriptions of well-known systems, devices, circuits, and methods are omitted so as not to obscure the description of the present disclosure with unnecessary detail.

For the purpose of describing the technical solutions of the present disclosure, the following describes through specific embodiments.

Figure 1:
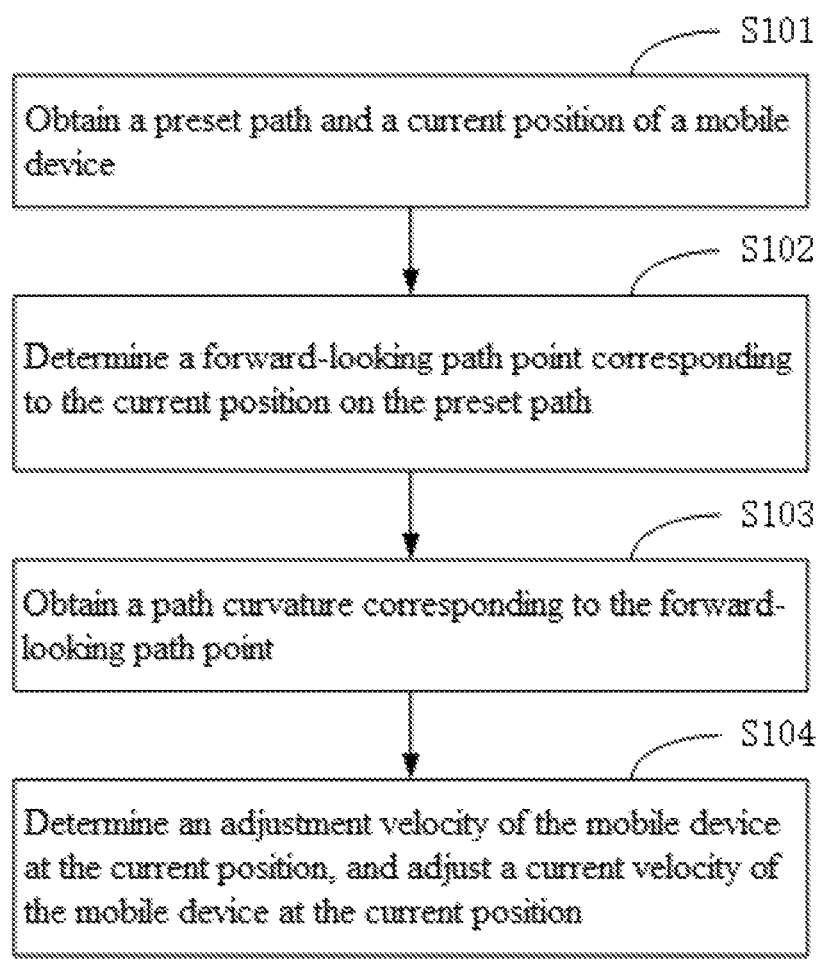
FIG. 1 is a flow chart of an embodiment of a path tracking method according to the present disclosure.

FIG. 1 is a flow chart of an embodiment of a path tracking method according to the present disclosure. In this embodiment, a path tracking method for a mobile device (e.g., a mobile robot) having a localization equipment such as a laser sensor or a visual sensor is provided. The method is a computer-implemented method executable for a processor of the mobile robot, which may be implemented through and applied to a path tracking apparatus shown in FIG. 10 or a mobile robot shown in FIG. 11, or implemented through a computer readable storage medium. As shown in FIG. 1, the method includes the following steps.

S101: obtaining a preset path and a current position of the mobile device.

In this embodiment, the preset path is a path at which the mobile device is moved that is to be tracked by the path tracking method. For example, the preset path can be a specified path or a path obtained through path planning, which is not limited herein. It can obtain path information of the preset path, for example, the path information of the preset path in a specified coordinate system.

The current position of the mobile device is a position at which the mobile device is located. The position information of the current position of the mobile objective can be obtained by, for example, positioning the mobile device by a localization method using the above-mentioned localization equipment to obtain a coordinate of the current position of the mobile device in the specified coordinate system. It is should be noted that, the current position of the mobile device may be on the preset path and may be not.

In one embodiment, the position of the mobile device can be obtained during the mobile device being moved by using a localization method based on a preset time interval, a preset moving distance interval, or the like, which is not limited herein.

S102: determining a forward-looking path point corresponding to the current position on the preset path.

In this embodiment, during the mobile device being moved, one path point on the preset path that is ahead of the mobile device can be selected to take as the forward-looking path point (e.g., point P in FIG. 8 and FIG. 9), so as to adjust the motion state of the mobile device based on the forward-looking path point. The path tracking is performed by selecting the forward-looking path points corresponding to different positions of the mobile device during the mobile device being moved and correspondingly adjusting the motion state of the mobile device.

Figure 2:
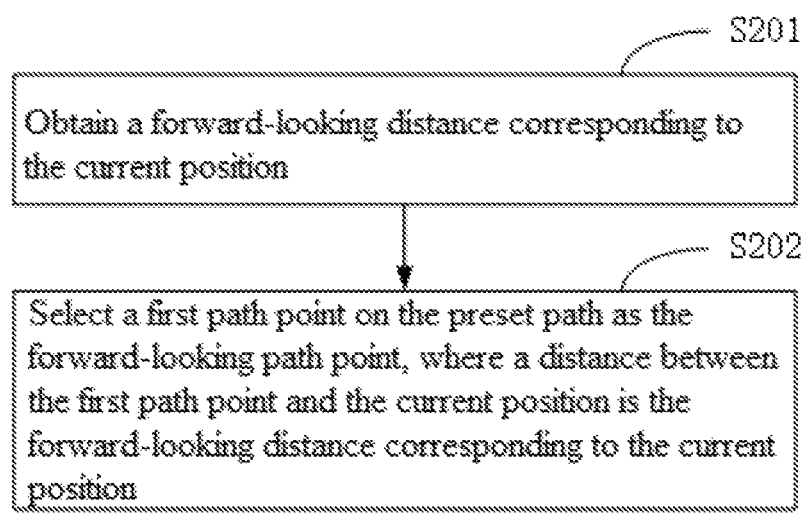
FIG. 2 is a flow chart of an example of determining a forward-looking path point corresponding to a current position in the path tracking method of FIG. 1.

FIG. 2 is a flow chart of an example of determining a forward-looking path point corresponding to a current position in the path tracking method of FIG. 1. As shown in FIG. 2, step S102 of the method of FIG. 1 includes the following steps.

S201: obtaining a forward-looking distance corresponding to the current position.

In this embodiment, the forward-looking distances of the mobile device at different positions of the mobile device can be the same or different, which not limited herein. The forward-looking distance is for determining the forward-looking path point corresponding to the current position of the mobile device.

In one embodiment, S201 may include:

obtaining a preset forward-looking distance and taking the preset forward-looking distance as the forward-looking distance corresponding to the current position; or obtaining an adjustment forward-looking distance corresponding to a previous position of the mobile device and taking the adjustment forward-looking distance corresponding to the previous position as the forward-looking distance corresponding to the current position.

In this embodiment, as an example, the preset forward-looking distance can be obtained to take as the forward-looking distance corresponding to the current position, so as to determine the forward-looking path point corresponding to the current position. In which, the preset forward-looking distance can be a fixed distance, and in this case, the corresponding forward-looking distances while the mobile device is at different positions are the same; or a correspondence table between the preset forward-looking distance and different positions can be generated in advance so that the corresponding preset forward-looking distance can be searched from the correspondence table based on the current position of the mobile device, and in this case, the corresponding forward-looking distances while the mobile device is at different positions can be the same or not the same, which is determined by the correspondence table. There can still be other ways to set the preset forward-looking distance, which is not limited herein.

As another example, the forward-looking distance can be adjusted during the path tracking, and the forward-looking distance of the mobile device at the previous position can be adjusted to obtain the adjustment forward-looking distance corresponding to the previous position, and then the adjustment forward-looking distance can be taken as the corresponding forward-looking distance of the mobile device at the current position, so as to determine the forward-looking path point corresponding to the current position of the mobile device.

For example, assuming that an initial forward-looking distance is set, and position A1, position A2, and position A3 are the positions of the mobile device which are successively adjacent to each other in order. When the mobile device is at position A1, the forward-looking path point corresponding to position A1 is determined through the initial forward-looking distance, and the initial forward-looking distance is adjusted to obtain the adjustment forward-looking distance corresponding to position A1; when the mobile device is at position A2, the adjustment forward-looking distance corresponding to position A1 is taken as the forward-looking distance of position A2, the forward-looking path point corresponding to position A2 is determined, and the forward-looking distance of position A2 is adjusted to obtain the adjustment forward-looking distance corresponding to position A2; when the mobile device is at position A3, the adjustment forward-looking distance corresponding to position A2 is taken as the forward-looking distance of position A3, the forward-looking path point corresponding to position A3 is determined, and the forward-looking distance of position A3 is adjusted to obtain the adjustment forward-looking distance corresponding to position A3. And then, the forward-looking distance corresponding to the position of the mobile device can be obtained through the above-mentioned manner, which is not described herein.

In this embodiment, the forward-looking distance is continuously adjusted during the path tracking, and the adjustment forward-looking distance corresponding to the previous position is taken as the forward-looking distance corresponding to the current position, which can adjust the forward-looking distance according to different path conditions in time, so that the forward-looking distance can be more suitable for the current path condition, thereby making the forward-looking path point determined through the forward-looking distance to be more appropriate so as to improve the stability of path tracking.

S202: selecting a first path point on the preset path as the forward-looking path point, where a distance between the first path point and the current position is the forward-looking distance corresponding to the current position.

In this embodiment, a path point on the preset path that has a distance with respect to the current position of the mobile device equal to the forward-looking distance corresponding to the current position can be selected as the forward-looking path point. If there are a plurality of first path points on the preset path, one path point among the plurality of first path points that has a relative position of the backmost position can be selected as the forward-looking path point. In which, the relative position of the backmost position means the case that the plurality of first path points are sorted according to a direction from a starting point of the preset path to an end point of the preset path, and the first path point that is arranged at the last position is determined as the forward-looking path point corresponding to the current position.

S103: obtaining a path curvature corresponding to the forward-looking path point.

In this embodiment, the path curvature of one path point is the curvature of a curve of the preset path at the path point, which is used to represent the degree of bending of the preset path at the path point. The path curvature corresponding to the forward-looking path point can be the path curvature of the forward-looking path point, the path curvature of one or more path points within a section of the preset path where the forward-looking path point is located, or a result of a data calculation on the path curvature of one or more path points within a section of the preset path where the forward-looking path point is located, which is not limited herein. In which, the data calculation can be a calculation such as addition, difference, multiplication, and weighted summation, which is not limited herein. The path curvature corresponding to the forward-looking path point can be calculated based on the path information of the preset path.

S104: determining an adjustment velocity of the mobile device at the current position based on the path curvature corresponding to the forward-looking path point, and adjusting a current velocity of the mobile device at the current position according to the adjustment velocity.

In this embodiment, the adjustment velocity is for indicating the velocity of the mobile device to be adjusted so that the mobile device is moved at the adjustment velocity. The path curvature corresponding to the forward-looking path point can represent the degree of bending of the path ahead of the mobile device. In this embodiment, the adjustment velocity corresponding to each position of the mobile device is determined at the position, and the motion state of the mobile device can be adjusted in time according to the path condition, thereby improving the stability of path tracking of the mobile device. Through the determined adjustment velocity, the velocity of the mobile device can be adjusted to be lower in the case that the path curvature is large, thereby avoiding the mobile device from leaving the track can be avoided so as to improve the stability.

In this embodiment, the forward-looking path point corresponding to the current position of the mobile device that is on the preset path is determined, and the adjustment velocity of the mobile device at the current position is determined based on the path curvature corresponding to the forward-looking path point, which can determine the adjustment velocity of the mobile device based on the curvature of the path, so as to adjust the velocity of the mobile device, thereby improving the stability of path tracking of the mobile device at different path curvatures.

Figure 3:
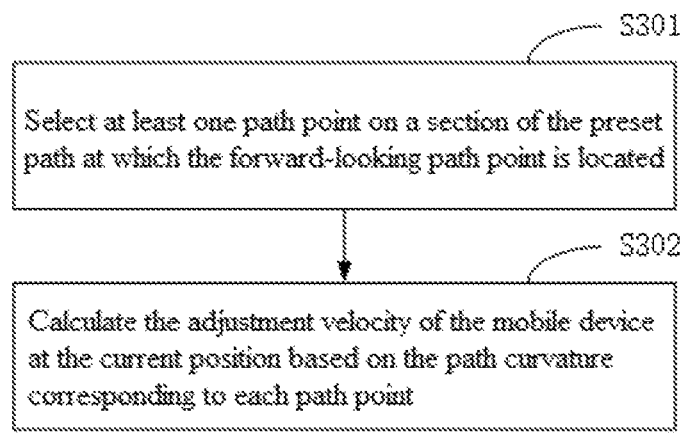
FIG. 3 is a flow chart of an example of determining an adjustment velocity in the path tracking method of FIG. 1.

FIG. 3 is a flow chart of an example of determining an adjustment velocity in the path tracking method of FIG. 1. As shown in FIG. 3, in one embodiment, step S104 of the method of FIG. 1 includes the following steps.

S301: selecting at least one path point on a section of the preset path at which the forward-looking path point is located.

In this embodiment, one or more path points in the section of the preset path where the forward-looking path point is located can be selected. The division of the section on the preset path can be determined according to actual needs, which is not limited herein.

Figure 4:
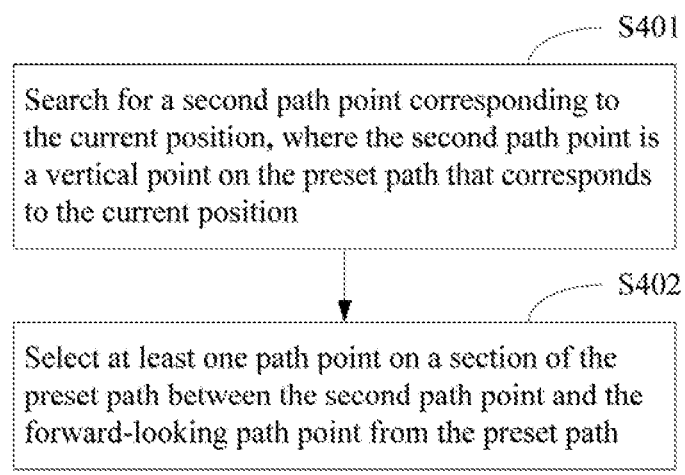
FIG. 4 is a flow chart of an example of selecting an path point in the path tracking method of FIG. 1.

FIG. 4 is a flow chart of an example of selecting an path point in the path tracking method of FIG. 1. As shown in FIG. 4, in one embodiment, step S301 of the method of FIG. 1 includes the following steps.

S401: searching for a second path point corresponding to the current position, where the second path point is a vertical point on the preset path that corresponds to the current position.

Figure 8:
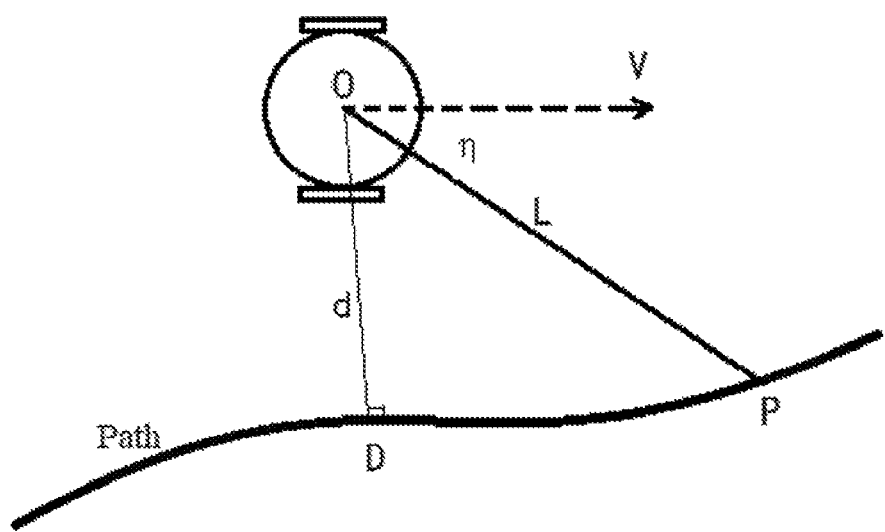
FIG. 8 is a schematic diagram of an example of a scenario of the path tracking method of FIG. 1.

In this embodiment, the vertical point on the preset path corresponding to the current position can be searched to take as the second path point corresponding to the current position. In the case that the current position of the mobile device is on the preset path, the current position of the mobile device can be taken as the second path point; in the case that the current position of the mobile device is not on the preset path, the vertical point corresponding to the current position can be searched on the preset path to take as the second path point. In which, the direction of a connection between the vertical point corresponding to the current position and the current position can be perpendicular to the tangential direction of the preset path at the vertical point. FIG. 8 is a schematic diagram of an example of a scenario of the path tracking method of FIG. 1. As shown in FIG. 8, point D is the corresponding vertical point of the current position on the preset path, which can be taken as the second path point.

S402: selecting at least one path point on a section of the preset path between the second path point and the forward-looking path point from the preset path.

In this embodiment, it can take the second path point and the forward-looking path point as two end points of the section of the preset path, take the section on the preset path as the section where the forward-looking path point is located, and select one or more path points from the section. For example, it can select one path point at every preset distance interval, select a preset number of path points from the section at uniform intervals, or select the path point according to other selection manners, which is not limited herein. As shown in FIG. 8, within the section between points D and P, it selects at least one path point.

In this embodiment, the path point is selected from the section of the preset path between the vertical point corresponding to the current position on the preset path and the forward-looking path point, so that the selected path point can more accurately reflect the path condition of the section of the preset path that is ahead of the mobile device, thereby making the determined adjustment velocity more accurate, so that the motion state of the mobile device can be adjusted more accurately and timely, thereby improving the stability of path tracking.

S302: calculating the adjustment velocity of the mobile device at the current position based on the path curvature corresponding to each path point.

In this embodiment, the path curvature corresponding to one path point can be the path curvature of the path point, or a result of a data calculation of the path curvature of the path point and the path curvature of other path points, which is not limited herein. For example, the data calculation can be a calculation such as addition, difference, multiplication, and weighted summation, which is not limited herein.

In this embodiment, the adjustment velocity is calculated based on the path curvatures corresponding to the plurality of path points of the section where the forward-looking path point is located, which can make the calculated adjustment velocity more accurate, thereby improving the stability of path tracking.

Figure 5:
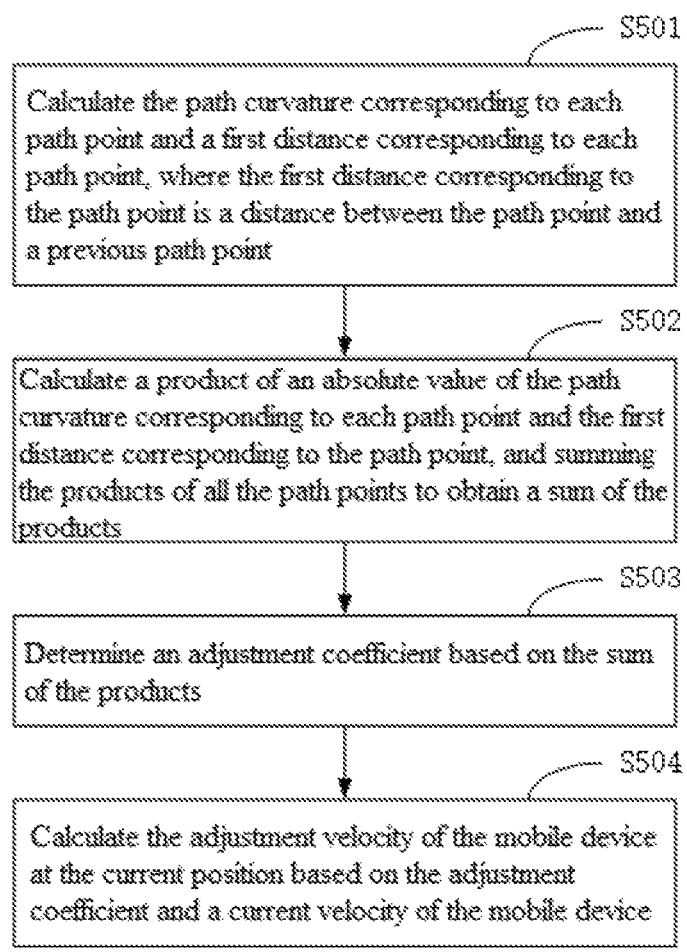
FIG. 5 is a flow chart of an example of determining an adjustment coefficient in the path tracking method of FIG. 1.

FIG. 5 is a flow chart of an example of determining an adjustment coefficient in the path tracking method of FIG. 1. As shown in FIG. 5, in one embodiment, step S302 of the method of FIG. 1 includes the following steps.

S501: calculating the path curvature corresponding to each path point and a first distance corresponding to each path point, where the first distance corresponding to the path point is a distance between the path point and a previous path point.

In this embodiment, each path point corresponds to one first distance. Taking one path point as an example, the distance between the path point and its previous path point is the first distance corresponding to the path point. For example, each path point can be arranged according to a preset order, and the previous path point of the path point can be one path point that is adjacent to the path point and is arranged to be ahead of the path point. In which, the preset order can be an order from one end point to another end point of the section where the forward-looking path point is located, or can have another arrangement order, which is not limited herein.

In one embodiment, step S501 may include:
calculating a difference between the path curvature of each path point and the path curvature of the previous path point to take as the path curvature corresponding to the path point.

In this embodiment, each path point corresponds to one path curvature.

Taking one path point as an example, the difference between the path curvature of the path point and the path curvature of its adjacent previous path point is taken as the path curvature corresponding to the path point.

In this embodiment, the difference between the path curvature of one path point and that of its previous path point is taken as the path curvature corresponding to the path point, which can make the path curvature corresponding to each path point accurately reflect the variation of the path curvature at each path point. By reflecting the path condition of the path ahead of the mobile device through the variation of the path curvature, the adjustment velocity of the mobile device can determined based on the variation of the path curvature, thereby improving the stability of path tracking.

S502: calculating a product of an absolute value of the path curvature corresponding to each path point and the first distance corresponding to the path point, and summing the products of all the path points to obtain a sum of the products.

In this embodiment, for one path point, the absolute value of the path curvature corresponding to the path point can be first calculated. For example, if the path curvature corresponding to one path point is the difference between the path curvature of the path point and the path curvature of its adjacent previous path point, the absolute value of the difference can be calculated. Then, the product of the absolute value and the first distance corresponding to the path point can be calculated. The product corresponding to each path point is respectively calculated, and the products corresponding to all the path points are added to obtain the sum. In which, the summing the products of all the path points can be directly summing the products corresponding to all the path points, or weighted summing the products corresponding to all the path points, which is not limited herein.

S503: determining an adjustment coefficient based on the sum of the products.

In this embodiment, the adjustment coefficient can be determined based on the sum of the products. The adjustment coefficient is for calculating the adjustment velocity of the mobile device.

Figure 6:
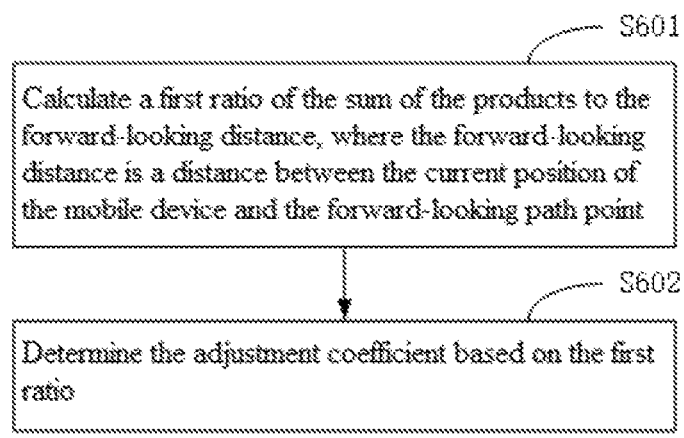
FIG. 6 is a flow chart of an example of calculating an adjustment velocity based on an adjustment coefficient and a current velocity of the mobile device in the path tracking method of FIG. 1.

FIG. 6 is a flow chart of an example of calculating an adjustment velocity based on an adjustment coefficient and a current velocity of the mobile device in the path tracking method of FIG. 1. As shown in FIG. 6, in one embodiment, step S503 of the method of FIG. 1 includes the following steps.

S601: calculating a first ratio of the sum of the products to the forward-looking distance, where the forward-looking distance is a distance between the current position of the mobile device and the forward-looking path point.

In this embodiment, it can obtain a coordinate of the current position and a coordinate of the forward-looking path point, and calculate the forward-looking distance based on the two coordinates; or in step S102, if the forward-looking path point corresponding to the current position is determined through the forward-looking distance corresponding to the current position, the forward-looking distance can be directly obtained in step S601, so as to obtain the first ratio by dividing the sum of the products by the forward-looking distance.

S602: determining the adjustment coefficient based on the first ratio.

In this embodiment, the forward-looking distance is added to the consideration factor for determining the adjustment coefficient, which can have different adjustment to the motion state of the mobile device at different forward-looking distances. By comprehensive consideration of two factors of the path curvature and the forward-looking distance, the determined adjustment coefficient can be more appropriate, so that the determined adjustment velocity can be more suitable for the condition of the path in front of the mobile device, and the stability of path tracking can be improved.

In one embodiment, S602 can include:
calculating the adjustment coefficient based on a penalty function formula and the first ratio, where the penalty function formula is:

$$P = 1 - \frac{2}{\pi}\arctan(\chi); \quad (1)$$

where, P is the adjustment coefficient, and $\chi$ is the first ratio.

In this embodiment, by using the penalty function, the adjustment coefficient will be correspondingly decreased as the first ratio increases, and the smaller adjustment coefficient can be obtained while the path curvature is large, thereby slowing the velocity of the mobile device and improving the stability and robustness of the path tracking of the mobile device.

S504: calculating the adjustment velocity of the mobile device at the current position based on the adjustment coefficient and a current velocity of the mobile device.

In this embodiment, the velocity of the mobile device at the current position can be obtained to take as the current velocity, and the adjustment velocity of the mobile device at the current position is calculated based on the adjustment coefficient and the current velocity.

In this embodiment, the adjustment coefficient is determined based on three path condition related factors of the path curvature, the distance between the path points, and the forward-looking distance, and the adjustment velocity is calculated based on the adjustment coefficient and the current velocity, so that the calculated adjustment velocity can be more suitable for the path condition, thereby increasing the stability of path tracking.

Figure 7:
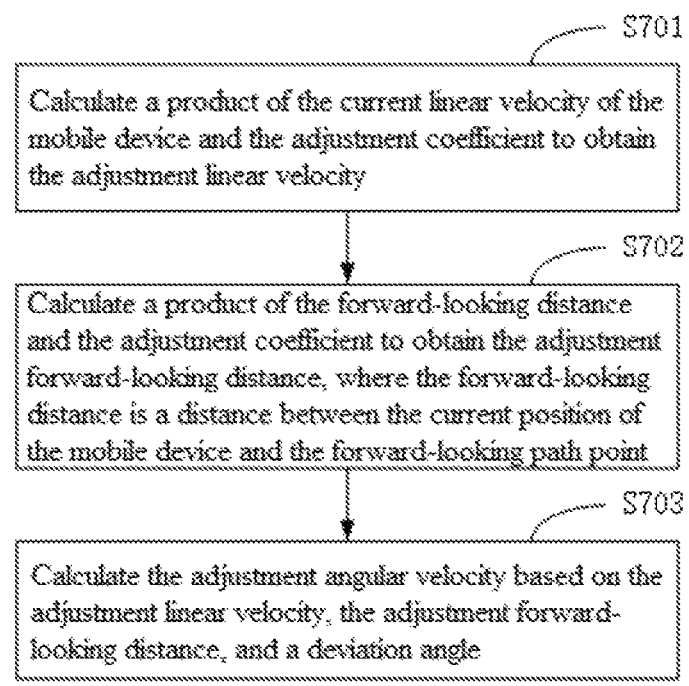
FIG. 7 is a flow chart of an example of calculating an adjustment angular velocity in the path tracking method of FIG. 1.

In one embodiment, the current velocity includes a current line velocity, and the adjustment velocity includes an adjustment line velocity and an adjustment angular velocity. FIG. 7 is a flow chart of an example of calculating an adjustment angular velocity in the path tracking method of FIG. 1. As shown in FIG. 7, in one embodiment, step S504 of the method of FIG. 1 includes the following steps.

S701: calculating a product of the current linear velocity of the mobile device and the adjustment coefficient to obtain the adjustment linear velocity.

In this embodiment, the current line velocity is the line velocity of the mobile device at the current position. The current line velocity can be multiplied by the adjustment coefficient to obtain the adjustment line velocity. The adjustment line velocity is for indicating the mobile device to adjust the line velocity to the adjustment line velocity.

S702: calculating a product of the forward-looking distance and the adjustment coefficient to obtain the adjustment forward-looking distance, where the forward-looking distance is a distance between the current position of the mobile device and the forward-looking path point.

In this embodiment, the forward-looking distance of the mobile device at the current position can be multiplied by the adjustment coefficient to obtain the adjustment forward-looking distance. The adjustment forward-looking distance is for determining the forward-looking path point corresponding to the next position of the mobile device.

In this embodiment, the forward-distance distance is adjusted by using the adjustment coefficient, and the forward-looking distance is adjusted according to the path condition in time during the path tracking, so that the selection of the forward-looking distance and the forward-looking path point can be more suitable for the path condition in front, thereby improving the stability of path tracking. For example, the forward-looking distance can be shortened when the path curvature is large, thereby improving the stability to track the mobile device at the path with large curvature.

S703: calculating the adjustment angular velocity based on the adjustment linear velocity, the adjustment forward-looking distance, and a deviation angle, where the deviation angle is an included angle between a vector direction from the current position of the mobile device to the forward-looking path point and a direction of the current linear velocity of the mobile device.

In this embodiment, it can take the current position of the mobile device as a starting point and take the forward-looking path point as an end point to obtain a vector, where there is an included angle between the vector and the current line velocity of the mobile device, and the included angle is the deviation angle of the mobile device at the current position. The adjustment angular velocity can be calculated based on the adjustment linear velocity, the adjustment forward-looking distance, and the deviation angle. The adjustment angular velocity is for indicating the mobile device to adjust the angular velocity. FIG. 8 is a schematic diagram of an example of a scenario according to an embodiment of the present disclosure. As shown in FIG. 8, the included angle η between velocity V and vector OP is the deviation angle.

In this embodiment, the adjustment linear velocity, the adjustment forward-looking distance, and the adjustment angular velocity are calculated through the adjustment coefficient, which adjusts the motion state of the mobile device through the above-mentioned three during the path tracking, and the stability of path tracking can be improved through multiple aspects.

In one embodiment, S703 may include:
calculating a second ratio of the adjustment linear velocity to the adjustment forward-looking distance; and
calculating a product of the sine of the deviation angle and the second ratio to obtain the adjustment angular velocity.

In this embodiment, it can divide the adjustment linear velocity by the adjustment forward-looking distance to obtain the second ratio, then calculate the sine of the deviation angle, and then multiply the sine of the deviation angle by the second ratio to obtain the adjustment angular velocity.

A mobile robot is taken as an example as follows. As shown in FIG. 8, in the case that a mobile robot (see the circular object in FIG. 8) tracks its path at a velocity V, it inevitably generates a slight distance deviation d and an angular deviation η with respect to the path. How to control the robot to continuously reduce the absolute value of d and η is a problem of path tracking. In the prior an, it use the geometric center of the robot as an origin and a length L as a radius to make an arc, such that there is an intersection point P between the arc and the path. Hence, a designed controller of the robot can be described through the following formulas (2) and (3):

$$\eta = \arccos(\vec{V} \cdot \vec{P}); \quad (2)$$

$$\omega = \frac{V}{L} \cdot \sin\eta \quad (3)$$

where, $\vec{P}$ is the vector from point O to point P, and ω is the angular velocity.

Under the guidance of the above-mentioned controller, the robot will be moved at the line velocity of V and the angular velocity of ω to ensure that the robot can track the path within a certain range.

Figure 9:
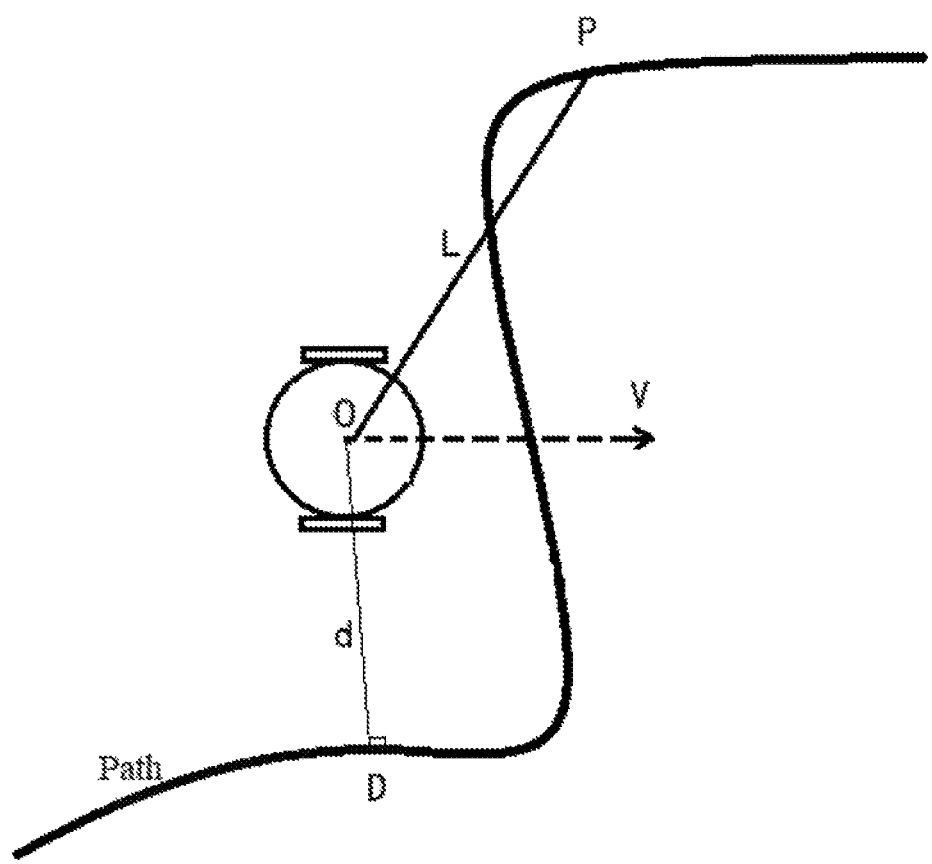
FIG. 9 is a schematic diagram of another example of a scenario of the path tracking method of FIG. 1.

However, in the case that the curvature of the path is large, the length L is likely to skip a section of the path. FIG. 9 is a schematic diagram of another example of a scenario of the path tracking method of FIG. 1. As shown in FIG. 9, in such a case, the robot is prone to have unstable control effects and caused to leave the track.

In this embodiment, the curvature of the path is taken into consideration, and a penalty function with the path curvature as a variable is added to the forward-looking distance L and the velocity of the robot, so that the robot can be moved slowly at which the curvature is large, and can be more close to the path. In which, the penalty function is as shown in formula (5):

$$\chi(L) = \frac{\sum_{i=1}^{N_L} |\Delta\kappa_i| \Delta s_i}{L}; \quad (4)$$

$$P(L) = 1 - \frac{2}{\pi}\arctan(\chi(L)); \quad (5)$$

where, $N_L$ is the number of all the path points in the section formed by point D and the forward-looking path point P on the path; $\Delta\kappa_i = \kappa_i - \kappa_{i-1}$ is the change between the path curvature of the i-th path point and the path curvature of the i-th path point, $$\kappa_i = \frac{y_i''}{(1 + y_i'^2)^{\frac{3}{2}}}.$$

is the path curvature of the i-th path point, $y_i$ is the curve equation of the path; $\Delta s_i = s_i - s_{i-1}$ is the difference between the coordinate of the i-th path point and, the coordinate of the i-1-th path point, and L is the forward-looking distance of the mobile device at the current position that is equal to the adjustment forward-looking distance calculated through the previous position.

the adjustment linear velocity, the adjustment forward-looking distance, and the adjustment angular velocity can be calculated through the equations (6), (7), and (8), respectively.

$$V_c = V \cdot P(L); \quad (6)$$

$$L_c = L \cdot P(L); \quad (7)$$

$$\omega_c = \frac{V_c}{L_c} \cdot \sin\eta; \quad (8)$$

where, V is the current linear velocity, $V_c$ is the calculated adjustment linear velocity, L is the forward-looking distance of the current position, $L_c$ is the calculated adjustment forward-looking distance that is taken as the forward-looking distance when the mobile device is at the next position, $\omega_c$ is the adjustment linear velocity, and η is the deviation angle.

In this embodiment, by adding the penalty function (the penalty function is related to the curvature of the path) to the originally fixed forward-looking distance, the stability of the control of the path tracking is improved. In the case that the robot is moved to a position near to the positions with large curvature, the penalty function is increased to reduce the forward-looking distance so that the robot track the path in a closer manner and in a slower velocity to improve the stability of the control of the path tracking; in the case that the robot is moved to a position near to the positions with a small curvature, the penalty function allows the velocity of the robot to be increased to ensure the efficiency of the method. In this embodiment, it optimizes the forward-looking distance and the movement velocity based on the curvature of the path near the robot. The forward-looking distance and the movement velocity are optimized through the penalty function with the curvature as a variable, so that the robot can slow down the velocity and shorten the forward-looking distance in case that the path curvature is large, thereby significantly improving the robustness of the path tracking the robot.

In this embodiment, the forward-looking path point corresponding to the current position of the mobile device that is on the preset path is determined, and the adjustment velocity of the mobile device at the current position is determined based on the path curvature corresponding to the forward-looking path point, which can determine the adjustment velocity of the mobile device based on the curvature of the path, so as to adjust the velocity of the mobile device, thereby improving the stability of path tracking of the mobile device at different path curvatures.

It should be understood that, the sequence of the serial number of the steps in the above-mentioned embodiments does not mean the execution order while the execution order of each process should be determined by its function and internal logic, which should not be taken as any limitation to the implementation process of the embodiments.

Figure 10:
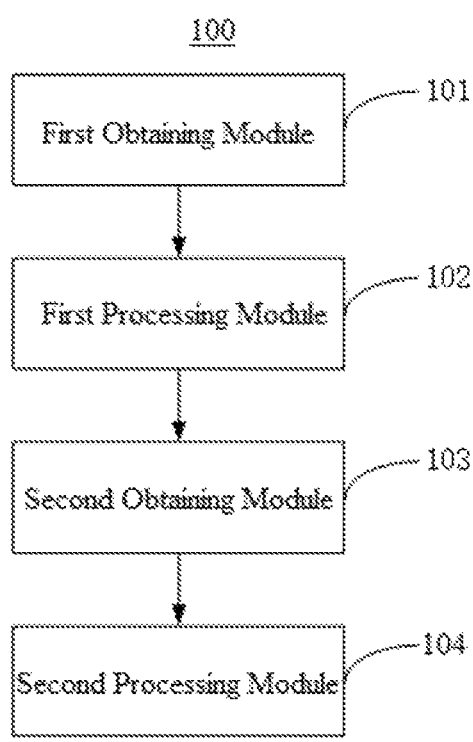
FIG. 10 is a schematic block diagram of an embodiment of a path tracking apparatus according to the present disclosure.

FIG. 10 is a schematic block diagram of an embodiment of a path tracking apparatus according to the present disclosure. In this embodiment, a path tracking apparatus 100 for a mobile device (e.g., a mobile robot) having a localization equipment such as a laser sensor or a visual sensor is provided. The path tracking apparatus 100 can be applied to the mobile device such as a mobile robot shown in FIG. 11 or be the robot itself. The path tracking apparatus 100 corresponds to the path tracking method described in the foregoing embodiment. For the convenience of explanation, only the parts related to this embodiment are shown.

As shown in FIG. 10, the path tracking apparatus 100 includes a first obtaining module 101, a first processing module 102, a second obtaining module 103, and a second processing module 104.

The first obtaining module 101 is configured to obtain a preset path and a current position of the mobile device.

The first processing module 102 is configured to determine a forward-looking path point corresponding to the current position on the preset path.

The second obtaining module 103 is configured to obtain a path curvature corresponding to the forward-looking path point.

The second processing module 104 is configured to determine an adjustment velocity of the mobile device at the current position based on the path curvature corresponding to the forward-looking path point, and adjust a current velocity of the mobile device at the current position according to the adjustment velocity.

In one embodiment, the first processing module 102 can be configured to:

obtain a forward-looking distance corresponding to the current position; and select a first path point on the preset path as the forward-looking path point, where a distance between the first path point and the current position is the forward-looking distance corresponding to the current position.

In one embodiment, the first processing module 102 is configured to:

obtain a preset forward-looking distance and taking the preset forward-looking distance as the forward-looking distance corresponding to the current position; or obtain an adjustment forward-looking distance corresponding to a previous position of the mobile device and taking the adjustment forward-looking distance corresponding to the previous position as the forward-looking distance corresponding to the current position.

In one embodiment, the second processing module 104 is configured to:

select at least one path point on a section of the preset path at which the forward-looking path point is located; and calculate the adjustment velocity of the mobile device at the current position based on the path curvature corresponding to each path point.

In one embodiment, the second processing module 104 is configured to:

search for a second path point corresponding to the current position, wherein the second path point is a vertical point on the preset path corresponding to the current position; and select at least one path point on a section of the preset path between the second path point and the forward-looking path point from the preset path.

In one embodiment, the second processing module 104 is configured to:

calculate the path curvature corresponding to each path point and a first distance corresponding to each path point, wherein the first distance corresponding to the path point is a distance between the path point and a previous path point;

calculate a product of an absolute value of the path curvature corresponding to each path point and the first distance corresponding to the path point, and summing the products of all the path points to obtain a sum of the products;

determine an adjustment coefficient based on the sum of the products; and calculate the adjustment velocity of the mobile device at the current position based on the adjustment coefficient and a current velocity of the mobile device.

In one embodiment, the second processing module 104 is configured to:

calculate a difference between the path curvature of each path point and the path curvature of the previous path point to take as the path curvature corresponding to the path point.

In one embodiment, the second processing module 104 is configured to:

calculate a first ratio of the sum of the products to the forward-looking distance, wherein the forward-looking distance is a distance between the current position of the mobile device and the forward-looking path point; and determine the adjustment coefficient based on the first ratio.

In one embodiment, the second processing module 104 is configured to:

calculate the adjustment coefficient based on a penalty function formula and the first ratio, wherein the penalty function formula is:

$$P = 1 - \frac{2}{\pi}\arctan(\chi);$$

where, P is the adjustment coefficient, and $\chi$ is the first ratio.

In one embodiment, the current velocity includes a current line velocity, and the adjustment velocity includes an adjustment line velocity and an adjustment angular velocity; and the second processing module 104 is configured to:

calculate a product of the current linear velocity of the mobile device and the adjustment coefficient to obtain the adjustment linear velocity;

calculate a product of the forward-looking distance and the adjustment coefficient to obtain the adjustment forward-looking distance, wherein the forward-looking distance is a distance between the current position of the mobile device and the forward-looking path point; and calculate the adjustment angular velocity based on the adjustment linear velocity, the adjustment forward-looking distance, and a deviation angle, wherein the deviation angle is an included angle between a vector direction from the current position of the mobile device to the forward-looking path point and a direction of the current linear velocity of the mobile device.

In one embodiment, the second processing module 104 is configured to:

calculate a second ratio of the adjustment linear velocity to the adjustment forward-looking distance; and calculate a product of the sine of the deviation angle and the second ratio to obtain the adjustment angular velocity.

In this embodiment, each of the above-mentioned modules/units is implemented in the form of software, which can be computer program(s) stored in a memory of the path tracking apparatus 100 and executable on a processor of the path tracking apparatus 100. In other embodiments, each of the above-mentioned modules/units may be implemented in the form of hardware (e.g., a circuit of the path tracking apparatus 100 which is coupled to the processor of the path tracking apparatus 100) or a combination of hardware and software (e.g., a circuit with a single chip microcomputer).

In this embodiment, the forward-looking path point corresponding to the current position of the mobile device that is on the preset path is determined, and the adjustment velocity of the mobile device at the current position is determined based on the path curvature corresponding to the forward-looking path point, which can determine the adjustment velocity of the mobile device based on the curvature of the path, so as to adjust the velocity of the mobile device, thereby improving the stability of path tracking of the mobile device at different path curvatures.

Figure 11:
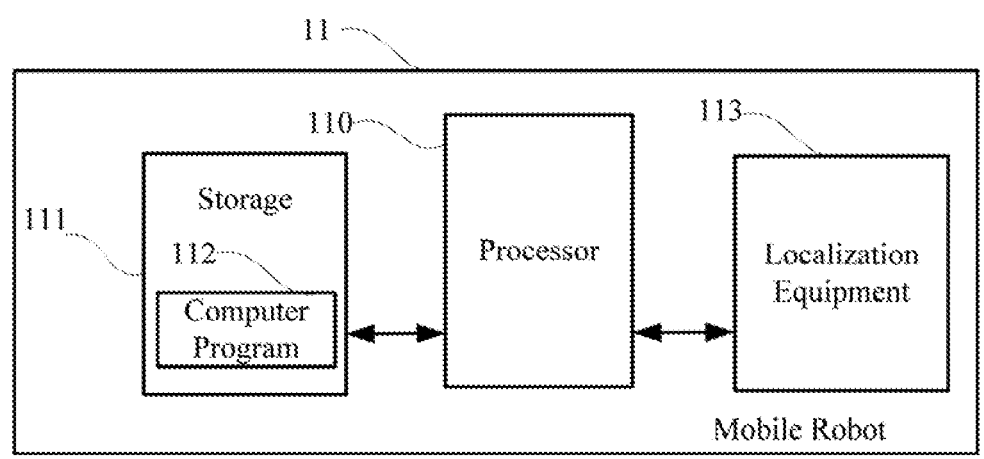
FIG. 11 is a schematic block diagram of an embodiment of a mobile robot according to the present disclosure.

FIG. 11 is a schematic block diagram of an embodiment of a mobile robot according to the present disclosure. As shown in FIG. 11, in this embodiment, the mobile robot 11 includes a processor 110, a storage 111, a computer program 112 stored in the storage 111 and executable on the processor 110, for example, a path tracking method, and a localization equipment 113. When executing (instructions in) the computer program 112, the processor 110 implements the steps in the above-mentioned embodiments of the path tracking method, for example, steps S101-S104 shown in FIG. 1. Alternatively, when the processor 110 executes the (instructions in) computer program 112, the functions of each module/unit in the above-mentioned device embodiments, for example, the functions of the modules 101-104 shown in FIG. 10 are implemented.

Exemplarily, the computer program 112 may be divided into one or more modules/units, and the one or more modules/units are stored in the storage 111 and executed by the processor 110 to realize the present disclosure. The one or more modules/units may be a series of computer program instruction sections capable of performing a specific function, and the instruction sections are for describing the execution process of the computer program 112 in the mobile robot 11.

The mobile robot 11 may include, but is not limited to, the processor 110 and the storage 111. It can be understood by those skilled in the art that FIG. 11 is merely an example of the mobile robot 11 and does not constitute a limitation on the mobile robot 11, and may include more or fewer components than those shown in the figure, or a combination of some components or different components. For example, the mobile robot 11 may further include an input/output device, a network access device, a bus, a display, and the like.

The processor 110 may be a central processing unit (CPU), or be other general purpose processor, a digital signal processor (DSP), an application specific integrated circuit (ASIC), a field-programmable gate array (FPGA), or be other programmable logic device, a discrete gate, a transistor logic device, and a discrete hardware component. The general purpose processor may be a microprocessor, or the processor may also be any conventional processor.

The storage 111 may be an internal storage unit of the mobile robot 11, for example, a hard disk or a memory of the mobile robot 11. The storage 111 may also be an external storage device of the mobile robot 11, for example, a plug-in hard disk, a smart media card (SMC), a secure digital (SD) card, flash card, and the like, which is equipped on the mobile robot 11. Furthermore, the storage 111 may further include both an internal storage unit and an external storage device, of the mobile robot 11. The storage 111 is configured to store the computer program 112 and other programs and data required by the mobile robot 11. The storage 111 may also be used to temporarily store data that has been or will be output.

Those skilled in the art may clearly understand that, for the convenience and simplicity of description, the division of the above-mentioned functional units and modules is merely an example for illustration. In actual applications, the above-mentioned functions may be allocated to be performed by different functional units according to requirements, that is, the internal structure of the device may be divided into different functional units or modules to complete all or part of the above-mentioned functions. The functional units and modules in the embodiments may be integrated in one processing unit, or each unit may exist alone physically, or two or more units may be integrated in one unit. The above-mentioned integrated unit may be implemented in the form of hardware or in the form of software functional unit. In addition, the specific name of each functional unit and module is merely for the convenience of distinguishing each other and are not intended to limit the scope of protection of the present disclosure. For the specific operation process of the units and modules in the above-mentioned system, reference may be made to the corresponding processes in the above-mentioned method embodiments, and are not described herein.

In the above-mentioned embodiments, the description of each embodiment has its focuses, and the parts which are not described or mentioned in one embodiment may refer to the related descriptions in other embodiments.

Those ordinary skilled in the art may clearly understand that, the exemplificative units and steps described in the embodiments disclosed herein may be implemented through electronic, hardware or a combination of computer software and electronic hardware. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure.

In the embodiments provided by the present disclosure, it should be understood that the disclosed apparatus/mobile robot and method may be implemented in other manners. For example, the above-mentioned apparatus/mobile robot embodiment is merely exemplary. For example, the division of modules or units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The units described as separate components may or may not be physically separated. The components represented as units may or may not be physical units, that is, may be located in one place or be distributed to multiple network units. Some or all of the units may be selected according to actual needs to achieve the objectives of this embodiment.

In addition, each functional unit in each of the embodiments of the present disclosure may be integrated into one processing unit, or each unit may exist alone physically, or two or more units may be integrated in one unit. The above-mentioned integrated unit may be implemented in the form of hardware or in the form of software functional unit.

When the integrated module/unit is implemented in the form of a software functional unit and is sold or used as an independent product, the integrated module/unit may be stored in a non-transitory computer-readable storage medium. Based on this understanding, all or part of the processes in the method for implementing the above-mentioned embodiments of the present disclosure are implemented, and may also be implemented by instructing relevant hardware through a computer program. The computer program may be stored in a non-transitory computer-readable storage medium, which may implement the steps of each of the above-mentioned method embodiments when executed by a processor. In which, the computer program includes computer program codes which may be the form of source codes, object codes, executable files, certain intermediate, and the like. The computer-readable medium may include any primitive or device capable of carrying the computer program codes, a recording medium, a USB flash drive, a portable hard disk, a magnetic disk, an optical disk, a computer memory, a read-only memory (ROM), a random access memory (RAM), electric carrier signals, telecommunication signals and software distribution media. It should be noted that the content contained in the computer readable medium may be appropriately increased or decreased according to the requirements of legislation and patent practice in the jurisdiction. For example, in some jurisdictions, according to the legislation and patent practice, a computer readable medium does not include electric carrier signals and telecommunication signals.

The above-mentioned embodiments are merely intended for describing but not for limiting the technical schemes of the present disclosure. Although the present disclosure is described in detail with reference to the above-mentioned embodiments, it should be understood by those skilled in the art that, the technical schemes in each of the above-mentioned embodiments may still be modified, or some of the technical features may be equivalently replaced, while these modifications or replacements do not make the essence of the corresponding technical schemes depart from the spirit and scope of the technical schemes of each of the embodiments of the present disclosure, and should be included within the scope of the present disclosure.

What is claimed is:

1. A computer-implemented path tracking method for a mobile device, comprising executing on a processor of the mobile device steps of:
    obtaining a preset path and a current position of the mobile device;
    determining, a forward-looking, path point corresponding to the current position on the preset path, wherein the forward-looking path point is one path point on the preset path that is ahead of the mobile device;
    obtaining a path curvature corresponding to the forward-looking path point, wherein the path curvature corresponding to the forward-looking path point is a curvature of a curve of the preset path at the forward-looking path point;
    determining an adjustment velocity of the mobile device at the current position based on the path curvature corresponding to the forward-looking path point; and
    adjusting a current velocity of the mobile device at the current position according to the adjustment velocity, wherein the current velocity comprises a current line velocity, and the adjustment velocity comprises an adjustment line velocity and an adjustment angular velocity;
    wherein the step of determining the adjustment velocity of the mobile device at the current position based on the path curvature corresponding to the forward-looking path point comprises:
        selecting at least one path point on a section of the preset path at which the forward-looking path point is located; and
        calculating the adjustment velocity of the mobile device at the current position based on the path curvature corresponding to each path point;
    wherein the step of calculating the adjustment velocity of the mobile device at the current position based on the path curvature corresponding, to each path point comprises:
        calculating the path curvature corresponding to each path point and a first distance corresponding to each path point, wherein the first distance corresponding to the path point is a distance between the path point and a previous path point;
        calculating a product of an absolute value of the path curvature corresponding to each path point and the first distance corresponding to the path point, and summing the products of all the path points to obtain a sum of the products;
        determining an adjustment coefficient based on the sum of the products; and calculating the adjustment velocity of the mobile device at the current position based on the adjustment coefficient and a current velocity of the mobile device;

wherein the step of calculating the adjustment velocity of the mobile device at the current position based on the adjustment coefficient and the current velocity of the mobile device comprises:

calculating a product of the current linear velocity of the mobile device and the adjustment coefficient to obtain the adjustment linear velocity;

calculating a product of the forward-looking distance and the adjustment coefficient to obtain the adjustment forward-looking distance, wherein the forward-looking distance is a distance between the current position of the mobile device and the forward-looking path point; and calculating the adjustment angular velocity based on the adjustment linear velocity, the adjustment forward-looking distance, and a deviation angle, wherein the deviation angle is an included angle between a vector direction from the current position of the mobile device to the forward-looking path point and a direction of die current linear velocity of the mobile device;

wherein the step of calculating the adjustment angular velocity based on the adjustment linear velocity, the adjustment forward-looking distance, and the deviation angle comprises:

calculating a second ratio of the adjustment linear velocity to the adjustment forward-looking distance; and calculating a product of the sine of the deviation angle and the second ratio to obtain the adjustment angular velocity.

2. The method of claim 1, wherein the step of determining the forward-looking path point corresponding to the current position on the preset path comprises:

obtaining a forward-looking distance corresponding to the current position; and selecting a first path point on the preset path as the forward-looking path point, wherein a distance between the first path point and the current position is the forward-looking distance corresponding to the current position;

the step of obtaining the forward-looking distance corresponding to the current position comprises:

obtaining a preset forward-looking distance and taking the preset forward-looking distance as the forward-looking distance corresponding to the current position; or obtaining an adjustment forward-looking distance corresponding to a previous position of the mobile device and taking the adjustment forward-looking distance corresponding to the previous position as the forward-looking distance corresponding to the current position.

3. The method of claim 1, wherein the step of selecting the at least one path point on the section at which the forward-looking path point is located comprises:

searching for a second path point corresponding to the current position, wherein the second path point is a vertical point on the preset path corresponding to the current position; and selecting at least one path point on a section of the preset path between the second path point and the forward-looking path point from the preset path.

4. The method of claim 1, wherein the step of calculating the path curvature corresponding to each path point comprises:

calculating a difference between the path curvature of each path point and the path curvature of the previous path point to take as the path curvature corresponding to the path point;

wherein the step of determining the adjustment coefficient based on the sum of the products comprises:

calculating a first ratio of the sum of the products to the forward-looking distance, wherein the forward-looking, distance is a distance between the current position of the mobile device and the forward-looking path point; and determining the adjustment coefficient based on the first ratio.

5. A mobile robot, comprising:

a localization equipment;

a memory;

a processor; and one or more computer programs stored in the memory and executable on the processor, wherein the one or more computer programs comprise:

instructions for obtaining a preset path and a current position of the mobile robot, wherein the current position is obtained through the localization equipment;

instructions for determining a forward-looking path point corresponding to the current position on the preset path;

instructions for obtaining a path curvature corresponding to the forward-looking path point;

instructions for determining an adjustment velocity of the mobile robot at the current position based on the path curvature corresponding to the forward-looking path point; and instructions for adjusting a current velocity of the mobile robot at the current position according to the adjustment velocity;

wherein the instructions for determining the adjustment velocity of the mobile robot at the current position based on the path curvature corresponding to the forward-looking path point comprise:

instructions for selecting at least one path point on a section of the preset path at which the forward-looking path point is located; and instructions for calculating the adjustment velocity of the mobile robot at the current position based on the path curvature corresponding to each path point;

wherein the instructions for calculating the adjustment velocity of the mobile robot at the current position based on the path curvature corresponding to each path point comprise:

instructions for calculating the path curvature corresponding to each path point and a first distance corresponding to each path point, wherein the first distance corresponding to the path point is a distance between the path point and a previous path point;

instructions for calculating a product of an absolute value of the path curvature corresponding to each path point and the first distance corresponding to the path point, and summing the products of all the path points to obtain a sum of the products;

instructions for determining an adjustment coefficient based on the sum of the products; and instructions for calculating the adjustment velocity of the mobile robot at the current position based on the adjustment coefficient and a current velocity of the mobile robot;

wherein the current velocity comprises a current line velocity, and the adjustment velocity comprises an adjustment line velocity and an adjustment angular velocity;

the instructions for calculating the adjustment velocity of the mobile robot at the current position based on the adjustment coefficient and the current velocity of the mobile robot comprise:

instructions for calculating a product of the current linear velocity of the mobile robot and the adjustment coefficient to obtain the adjustment linear velocity;

instructions for calculating a product of the forward-looking distance and the adjustment coefficient to obtain the adjustment forward-looking distance, wherein the forward-looking distance is a distance between the current position of the mobile robot and the forward-looking path point; and instructions for calculating the adjustment angular velocity based on the adjustment linear velocity, the adjustment forward-looking distance, and a deviation angle, wherein the deviation angle is an included angle between a vector direction from the current position of the mobile robot to the forward-looking path point and a direction of the current linear velocity of the mobile robot;

wherein the instructions for calculating the adjustment angular velocity based on the adjustment linear velocity, the adjustment forward-looking distance, and the deviation angle comprise:

instructions for calculating a second ratio of the adjustment linear velocity to the adjustment forward-looking distance; and instructions for calculating a product of the sine of the deviation angle and the second ratio to obtain the adjustment angular velocity.

6. The mobile robot of claim 5, wherein the instructions for determining the forward-looking path point corresponding to the current position on the preset path comprise:

instructions for obtaining a forward-looking distance corresponding to the current position; and instructions for selecting a first path point on the preset path as the forward-looking path point, wherein a distance between the first path point and the current position is the forward-looking distance corresponding to the current position.

7. The mobile robot of claim 6, wherein the instructions for obtaining the forward-looking distance corresponding to the current position comprise:

instructions for obtaining a preset forward-looking distance and taking the preset forward-looking distance as the forward-looking distance corresponding to the current position; or instructions for obtaining an adjustment forward-looking distance corresponding to a previous position of the mobile robot and taking the adjustment forward-looking distance corresponding to the previous position as the forward-looking distance corresponding to the current position.

8. The mobile robot of claim 5; wherein the instructions for selecting the at least one path point on the section at which the forward-looking path point is located comprise:

instructions for searching for a second path point corresponding to the current position, wherein the second path point is a vertical point on the preset path corresponding to the current position; and instructions for selecting at least one path point on a section of the preset path between the second path point and the forward-looking path point from the preset path.

9. The mobile robot of claim 5, wherein the instructions for calculating the path curvature corresponding to each path point comprise:

instructions for calculating a difference between the path curvature of each path point and the path curvature of the previous path point to take as the path curvature corresponding to the path point.

10. The mobile robot of claim 5, wherein the instructions for determining the adjustment coefficient based on the sum of the products comprise:

instructions for calculating a first ratio of the sum of the products to the forward-looking distance, wherein the forward-looking distance is a distance between the current position of the mobile robot and the forward-looking path point; and instructions for determining the adjustment coefficient based on the first ratio;

wherein the instructions for determining the adjustment coefficient based on the first ratio comprise:

instructions for calculating the adjustment coefficient based on a penalty function formula and the first ratio, wherein the penalty function formula is:

$$P = 1 - \frac{2}{\pi}\arctan(\chi);$$

where, P is the adjustment coefficient, and $\chi$ is the first ratio.

11. A computer-implemented path tracking method for a mobile device, comprising executing on a processor of the mobile device steps of:

obtaining a preset path and a current position of the mobile device;

determining a forward-looking path point corresponding to the current position on the preset path;

obtaining a path curvature corresponding to the forward-looking path point;

determining an adjustment velocity of the mobile device at the current position based on the path curvature corresponding to the forward-looking path point; and adjusting a current velocity of the mobile device at the current position according to the adjustment velocity;

wherein the step of determining the adjustment velocity of the mobile device at the current position based on the path curvature corresponding to the forward-looking path point comprises:

selecting at least one path point on a section of the preset path at which the forward-looking path point is located; and calculating the adjustment velocity of the mobile device at the current position based on the path curvature corresponding to each path point;

wherein the step of calculating the adjustment velocity of the mobile device at the current position based on the path curvature corresponding to each path point comprises:

calculating the path curvature corresponding to each path point and a first distance corresponding to each path point, wherein the first distance corresponding to the path point is a distance between the path point and a previous path point;

calculating a product of an absolute value of the path curvature corresponding to each path point and the first distance corresponding to the path point, and summing the products of all the path points to obtain a sum of the products;

determining an adjustment coefficient based on the sum of the products; and calculating the adjustment velocity of the mobile device at the current position based on the adjustment coefficient and a current velocity of the mobile device;

wherein the current velocity comprises a current line velocity, and the adjustment velocity comprises an adjustment line velocity and an adjustment angular velocity;

the step of calculating the adjustment velocity of the mobile device at the current position based on the adjustment coefficient and the current velocity of the mobile device comprises:

calculating a product of the current linear velocity of the mobile device and the adjustment coefficient to obtain the adjustment linear velocity;

calculating a product of the forward-looking distance and the adjustment coefficient to obtain the adjustment forward-looking distance, wherein the forward-looking distance is a distance between the current position of the mobile device and the forward-looking path point; and calculating the adjustment angular velocity based on the adjustment linear velocity, the adjustment forward-looking distance, and a deviation angle, wherein the deviation angle is an included angle between a vector direction from the current position of the mobile device to the forward-looking path point and a direction of the current linear velocity of the mobile device;

wherein the step of calculating the adjustment angular velocity based on the adjustment linear velocity, the adjustment forward-looking distance, and the deviation angle comprises:

calculating a second ratio of the adjustment linear velocity to the adjustment forward-looking distance, and calculating a product of the sine of the deviation angle and the second ratio to obtain the adjustment angular velocity.

12. The method of claim 11, wherein the step of determining the forward-looking path point corresponding to the current position on the preset path comprises:

obtaining a forward-looking distance corresponding to the current position; and selecting a first path point on the preset path as the forward-looking path point, wherein a distance between the first path point and the current position is the forward-looking distance corresponding to the current position.

13. The method of claim 12, wherein the step of obtaining the forward-looking distance corresponding to the current position comprises:

obtaining a preset forward-looking distance and taking the preset forward-looking distance as the forward-looking distance corresponding to the current position; or obtaining an adjustment forward-looking distance corresponding to a previous position of the mobile device and taking the adjustment forward-looking distance corresponding to the previous position as the forward-looking distance corresponding to the current position.

14. The method of claim 11, wherein the step of selecting the at least one path point on the section at which the forward-looking path point is located comprises:

searching for a second path point corresponding to the current position, wherein the second path point is a vertical point on the preset path corresponding to the current position; and selecting at least one path point on a section of the preset path between the second path point and the forward-looking path point from the preset path.

15. The method of claim 11, wherein the step of calculating the path curvature corresponding to each path point comprises:

calculating a difference between the path curvature of each path point and the path curvature of the previous path point to take as the path curvature corresponding to the path point.

16. The method of claim 11, wherein the step of determining the adjustment coefficient based on the sum of the products comprises:

calculating a first ratio of the sum of the products to the forward-looking distance, wherein the forward-looking distance is a distance between the current position of the mobile device and the forward-looking path point; and determining the adjustment coefficient based on the first ratio.

* * * * *